United States Patent [19]

Kawabata et al.

[11] Patent Number: 4,969,080
[45] Date of Patent: Nov. 6, 1990

[54] A METHOD OF DECOUPLING A THREE-PHASE CONVERTER

[75] Inventors: Takao Kawabata; Takeshi Miyashita; Yushin Yamamoto, all of Kobe; Hidehiko Sugimoto, Amagasaki, all of Japan

[73] Assignee: Mitsubishi Denki Kabushiki Kaisha, Japan

[21] Appl. No.: 378,807

[22] Filed: Jul. 12, 1989

[30] Foreign Application Priority Data

Nov. 28, 1988 [JP] Japan ................................ 63-301421

[51] Int. Cl.$^5$ .......................................... H02M 7/797
[52] U.S. Cl. ...................................... 363/41; 323/207; 363/8
[58] Field of Search ..................... 363/41, 8; 318/811; 323/207

[56] References Cited

U.S. PATENT DOCUMENTS 4,772,994 9/1988 Harada et al. ........................ 363/8

FOREIGN PATENT DOCUMENTS 147963 7/1987 Japan.

Primary Examiner—William H. Beha, Jr.
Attorney, Agent, or Firm—Leydig, Voit & Mayer

[57] ABSTRACT

A method of operating a three-phase converter to produce a signal at an output frequency by decoupling and digitally sampling inverter input signals and load voltage signals and feeding the resultant phase signals back into the inverter. The phase voltages activate switching elements in the inverter to switch signals a plurality of times within one cycle of the output frequency thus changing electrical power at a first frequency, including direct current, to A.C. power at the output frequency.

8 Claims, 13 Drawing Sheets

T = TSW

FIG. 7(b)  SAMP. & PWM REL.
(T = nTsw)

T = 2TSW

FIG. 14(a)
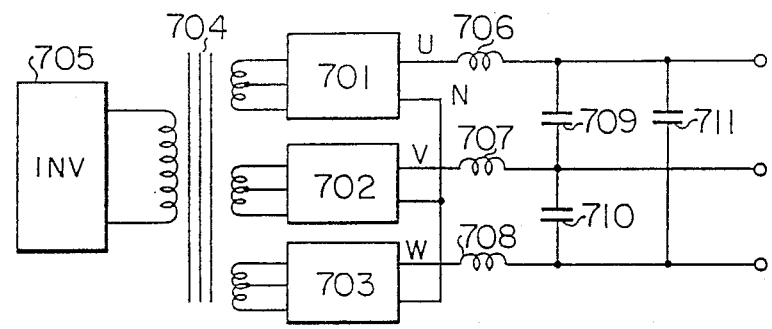
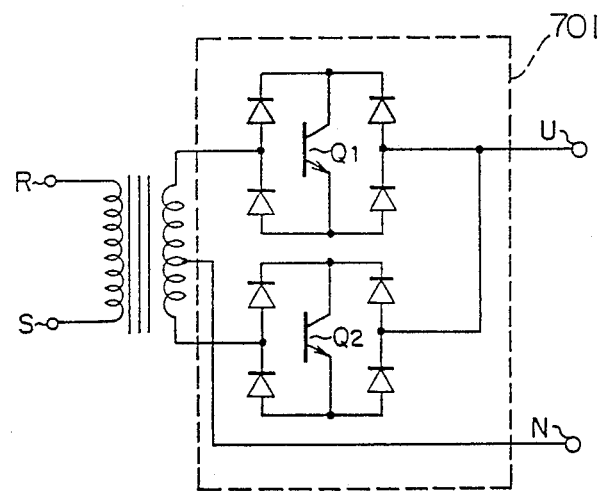
FIG. 14(b)

1

A METHOD OF DECOUPLING A THREE-PHASE CONVERTER

BACKGROUND OF THE INVENTION

The present invention relates to the converters for three-phase electric power, such as the PWM inverter or the cycloconverter.

A treatise on the decoupling control of a three-phase converter, "ON DECOUPLING CONTROL INSTANTANEOUS REACTIVE POWER CONTROL BY PWM-CONTROLLED POWER CONVERTER" appears in the record of the Semiconductor Power Conversion Conference, the Institute of Electrical Engineer of Japan, 1984 (SPC-84-80). This prior art will be explained with reference to FIG. 5 taken from Diagram 6 on page 54 of the above paper but using the same symbols as in the present invention.

In preparation for the explanation, reference will be had to FIG. 6 in regard to the arrangement of the current control system of a PWM (pulse width modulation) inverter being a representative three-phase converter to which the present invention and the prior art are directed. Referring to the figure, an inverter 1 includes six switches $S_1$ thru $S_6$ each of which is configured of a transistor and a diode connected in inverse parallel relationship to the transistor. The outputs of the inverter 1 are connected to an A.C. power source 5 through reactors 2, 3 and 4 each of which has an inductance $L_S$.

The inverter 1 is a so-called high-frequency PWM inverter in which the instantaneous values of output currents are controlled by high-frequency switching based on triangular waves comparison at, for example, 1 kHz, and it converts electric power bidirectionally between a D.C. power source 20 and the A.C. power source 5. Here, the A.C. power source 5 is not always a commercial power supply or the like, but it generally expresses the counter electromotive force of an induction machine, the voltage of the capacitor of a filter, etc. as a voltage source. The output currents $I_{AU}$, $I_{AV}$ and $I_{AW}$ of the inverter 1 are respectively detected by current sensors 6, 7 and 8, and they are transformed into values $I_{Ad}$ and $I_{Aq}$ on d - q coordinates by a coordinate transformation circuit 9, these values being fed back.

A current control block 12 detects the differences of the values $I_{Ad}$ and $I_{Aq}$ from current commands $I_{Aq}^*$ and $I_{Aq}^*$ by means of subtraction circuits 10 and 11, respectively, and applies them to a current-control amplifier 12-a. The current control block 12 produces the voltage commands $V_{Ad}^*$ and $V_{Aq}^*$ on the d - q coordinates generated by the inverter 1, and it applies them to a coordinate transformation circuit 13. The coordinate transformation circuit 13 transforms the voltage commands $V_{Ad}^*$ and $V_{Aq}^*$ from the d - q coordinates into the U-V-W coordinates to produce three-phase voltage commands $V_{AU}^*$, $V_{AV}^*$ and $V_{AW}^*$, to be applied to the PWM circuit 14. The PWM circuit 14 compares a triangular wave with each signal, for example, the signal $V_{AU}^*$ as illustrated in FIG. 7 by way of example, and applies switching signals to isolation amplifiers $A_1$ and $A_2$ to turn "on" the switch $S_1$ and "off" the switch $S_2$ of the corresponding phase, namely, the U-phase when the signal $V_{AU}^*$ is greater than the triangular wave, whereby the on/off states of the transistors $S_1$ and $S_2$ are controlled. As a result, the average value of the output voltage $V_{AU}$ of the U-phase in the pertinent cycle of the triangular wave becomes a value corresponding to the voltage command $V_{AU}^*$ of the U-phase. The on/off control of the transistor switches as stated above are repeated for all the switches $S_1$-$S_6$ every cycle of the triangular wave signal of the PWM, whereby the currents of the respective phases flowing through the reactors 2-4 are instantaneously controlled in accordance with the current commands $I_{Ad}^*$ and $I_{Aq}^*$. With such a high-frequency PWM as a premise, the current control in FIG. 5 based on the known material operates as stated below.

A control circuit in FIG. 5 produces signals in which the differences between the current command $I_{Ad}^*$, $I_{Aq}^*$ and current feedback signal $I_{Ad}$, $I_{Aq}$ are respectively amplified by a gain K. Further, it produces signals in which the respective feedback signals $I_{Ad}$ and $I_{Aq}$ of the d- and q-axes are multiplied by the output angular frequency $\omega$ and output inductance $L_S$ of the converter. The q-axis signal of these signals is subtracted from the inverter voltage command of the d-axis, and the d-axis signal is added to the inverter voltage command of the q-axis, whereby the current components of the d- and q-axes are prevented from interfering with each other.

The prior-art system thus far explained has had the following problems:

(a) Since the current control circuit is arranged on the d - q-axis coordinates to implement the decoupling control, the detected current signals must be transformed into signals on the d - q coordinates and the current control outputs must be transformed into the three-phase coordinates again.

(b) The decoupling method of the three-phase inverter in the paper SPC-84-80 of the conference record of the Research of Semiconductor Power Conversion of JIEE deals with the decoupling control in a continuous time system. A decoupling control in a sampled data system is performed under the assumption that the sampling time of the system is sufficiently short. That is, the prior-art inverter is difficult to adapt to sampling when the sampling time is not short enough.

An object of the present invention is to provide a method of decoupling control for a three-phase converter such as inverter which dispenses with the d - q coordinate transformation.

A further object of the present invention is to provide a method of decoupling control in a sampled-data system, which achieves precise decoupling control even in case of a long sampling time, thereby to realize an excellent control performance by a microprocessor, a digital signal processor, or the like.

In order to accomplish the objects, according to the present invention, a discrete-time control system with decoupling control is constructed on U-V-W coordinates in the following way:

(1) First, the formula of discrete-time control system with decoupling control on d - q coordinates is derived using a matrix.

(2) Subsequently, the formula is transformed from the d - q coordinates into the U-V-W coordinates, to obtain a matrix formula for decoupling the discrete-time control system on the U-V-W coordinates.

(3) Finally, a practicable control is set up on the basis of the matrix.

The decoupling current control system of the present invention controls current, using the currents and voltages of the U-V-W coordinates as they are. Besides, it takes into consideration the influence of the sampling time on the discrete-time control. As a result, when the sampling time is fixed, a current control system providing quicker response can be realized.

BRIEF DESCRIPTION OF THE DRAWINGS

FIGS. 7(a) and 7(b) are waveform diagrams showing the relationships between sampling and triangular waves of PWM;

FIGS. 14(a) and 14(b) are circuit diagrams for explaining a three-phase cycloconverter; for use in the present invention.

Throughout the drawings, the same symbols indicate identical or equivalent portions.

DESCRIPTION OF THE PREFERRED EMBODIMENTS

As explained in the known literature mentioned before, as an expedient for enhancing the performance of current minor loops, the current minor control loops are usually constructed on d - q coordinates and decoupling control is adopted. Heretofore, however, the decoupling has been based on the continuous time equation of the main circuit, and it has never been based on the precise discrete equation of a main circuit obtained using a formal time sampling method. Here, the decoupling of the sampling system will be studied to reveal that the decoupling term of $\omega T/2$ needs to be added. This term is more influential as the discretization time T becomes longer and as the output frequency $\omega$ becomes higher. The control loops on the d - q coordinates thus found are inversely transformed into the U-V-W coordinates, thereby the control system without a coordinate transformation means can be produced. Now, a control system and the state equation thereof will be studied.

Figure 2:
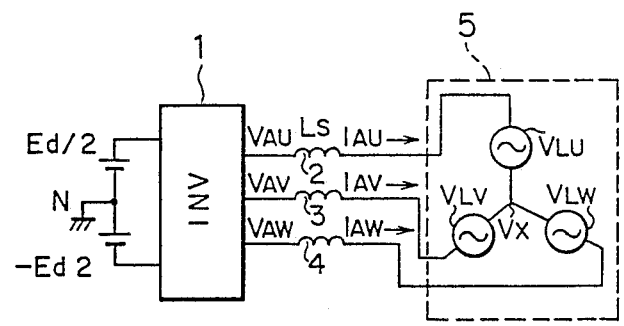
FIG. 2 is a diagram of the main circuit of a three-phase converter to which the present invention is directed.

The system is a current minor loop control of a three-phase converter which is represented by a three-phase bridge inverter as shown in FIG. 2. The output voltage of the inverter counteracts the counter electromotive force of the load through reactors as illustrated in the figure. The counter electromotive force of the load is the generalization of the voltage of a power source, the voltage of the capacitor of a filter, the induced voltage of an induction motor, etc.

Figure 7A:
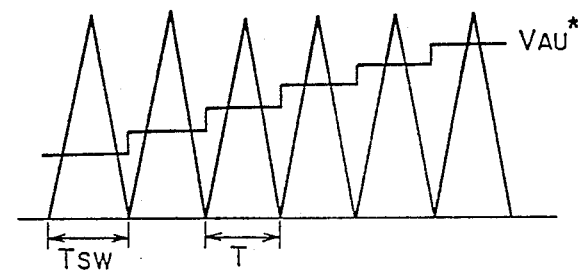
Figure 7A:
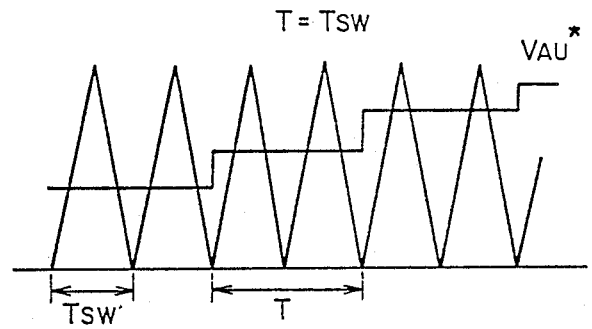

For the sake of brevity, the resistance of each reactor is neglected because it is usually less than 1%. It is also assumed that the sampling period T and the period $T_{SW}$ of the PWM of the inverter are synchronous and are equal or have an integer ratio, namely, $T = nT_{SW}$ as illustrated in FIG. 7. It is possible to apply any desired method of synchronization, such as a comparison of sinusoidal and triangular wave method, or optimum voltage vector selection based on software.

The state equation is as stated below.
In FIG. 2, variables are defined as follows:

[Definitions of Variables]

$V_A$: Phase voltage of the output of the inverter (with respect to ground)

$V_L$: Phase voltage of the counter electromotive force of the load $I_A$: Output current of the inverter $V_X$: Potential of the virtual neutral point of the load $\omega$: Angular velocity $2\pi f$ of the output frequency f T: Discretization time (Sampling period)

$T_{SW}$: Switching period

Thick letters denote vector quantities, and the meanings of subscripts are:

u, v, w: respective phase components of three phases d, q: components of the d - q coordinates mark *: command value Mark ⁻ : vector of synchronized rotation coordinates (the d - q coordinates)

A vector without the mark ⁻ is a three-phase vector.

In FIG. 2, letting the current $I_A$ of the reactor of each phase be a state variable, the output voltage $V_A$ of the inverter be an input variable, and the voltage $V_L$ of the load be a disturbance, Eq. (1) can be obtained as the state equation:

$$\mathbb{L}_S \frac{d}{dt} \mathbb{I}_A = \mathbb{V}_A - \mathbb{V}_L - V_X \tag{1}$$

where $I_A$, $V_A$ etc. are matrices with the respective suffixes attached to Eqs. (2), and $L_S$ is Eq. (3).

$$\mathbb{I} = \begin{pmatrix} I_U \\ I_V \\ I_W \end{pmatrix}, \quad \mathbb{V} = \begin{pmatrix} V_U \\ V_V \\ V_W \end{pmatrix} \tag{2}$$

$$\mathbb{L}_S = \begin{pmatrix} L_S & 0 & 0 \\ 0 & L_S & 0 \\ 0 & 0 & L_S \end{pmatrix} \tag{3}$$

In addition, the following equation holds as the relationship between $V_X$ and the inverter voltages:

$$V_X = (V_{AU} + V_{AV} + V_{AW})/3 \tag{4}$$

The following equation can be obtained from Eqs. (1) and (4):

$$L_S \frac{d}{dt} I_A = D \, V_A - V_L \quad (5)$$

where $$D = (1/3) \begin{pmatrix} 2 & -1 & -1 \\ -1 & 2 & -1 \\ -1 & -1 & 2 \end{pmatrix} \quad (6)$$

Next, the state equation on the d - q coordinates will be found. Eq. (5) is transformed into the synchronized rotation coordinate system of the d - q coordinates by a transformation matrix of Eq. (7). The voltage and current of the d - q coordinates are respectively denoted by V and I in order to be distinguished from the three-phase expression.

$$C = \sqrt{2/3} \begin{pmatrix} \cos\omega t & \cos(\omega t - 2\pi/3) & \cos(\omega t + 2\pi/3) \\ \sin\omega t & \sin(\omega t - 2\pi/3) & \sin(\omega t + 2\pi/3) \end{pmatrix} \quad (7)$$

The relationships between the three-phase expression and the d - q expression are given by the following equations:

$$V = \begin{pmatrix} V_q \\ V_d \end{pmatrix} = C \begin{pmatrix} V_U \\ V_V \\ V_W \end{pmatrix} = C \cdot V$$

$$I = \begin{pmatrix} I_q \\ I_d \end{pmatrix} = C \begin{pmatrix} I_U \\ I_V \\ I_W \end{pmatrix} = C \cdot I \quad (8)$$

Eq. (5) is transformed into the d - q coordinates by substituting the relationships of Eq. (8) thereinto, whereupon the result is arranged into the form of the state equation. Then, the following equation can be obtained:

$$\begin{pmatrix} \dot{I}_{Aq} \\ \dot{I}_{Ad} \end{pmatrix} = \begin{pmatrix} 0 & -\omega \\ \omega & 0 \end{pmatrix} \begin{pmatrix} I_{Aq} \\ I_{Ad} \end{pmatrix} + \begin{pmatrix} 1/L_S & 0 \\ 0 & 1/L_S \end{pmatrix} \begin{pmatrix} V_{Aq} \\ V_{Ad} \end{pmatrix} - \begin{pmatrix} 1/L_S & 0 \\ 0 & 1/L_S \end{pmatrix} \begin{pmatrix} V_{Lq} \\ V_{Ld} \end{pmatrix} \quad (9)$$

Eq. (9) is rewritten in a matrix expression into Eq. (10):

$$\dot{I}_A(t) = A' \, I_A(t) + F \, V_A(t) - F \, V_L(t) \quad (10)$$

Next, a time sampling state equation will be found. For finding the time sampling state equation, Eq. (10) on the d - q coordinates will be sampled with the sample time T. In this procedure, the voltage $V_A$ of the inverter and the counter electromotive force $V_L$ of the load in the k-th time interval $kT \leq t \leq (k+1)T$ are respectively assumed to be $V_A(k)$ and $V_L(k)$. In order to bring Eq. (10) into the sampled state equation in the form of Eq. (11), matrices A and F are found according to a procedure described by Benjamin C. Kuo in "Digital Control Systems", 1980, Holt, Rinehart and Winston, Inc. Then, Eq. (12) and Eq. (13) are respectively obtained.

$$\hat{I}_A(k+1) = A \, \hat{I}_A(k) + F \, \hat{V}_A(k) - F \, \hat{V}_L(k) \quad (11)$$

$$A = a^{-1}[(S \, I - A')^{-1}] \quad (12)$$

$$= \begin{pmatrix} a & -b \\ b & a \end{pmatrix}$$

$$F = \int_0^T A(T - \tau) \, F \, d\tau \quad (13)$$

$$= \begin{pmatrix} c & -d \\ d & c \end{pmatrix}$$

where $$\left. \begin{array}{l} a = \cos\omega T, \; b = \sin\omega T \\ c = (\sin\omega T)/(\omega L_S) \\ d = (2/\omega L_S)\sin^2\left(\dfrac{\omega T}{2}\right) \end{array} \right\} \quad (14)$$

The following equation can be obtained by Z-transforming Eq. (11):

$$Z \, I_A(Z) = A \, I_A(Z) + F \, V_A(Z) - F \, V_L(Z) \quad (15)$$

The interaction term b of the aforementioned matrix A corresponds to $\omega L_S$ in the continuous time system. Besides, the interaction term d of the matrix F has appeared anew as a result of sampling. All the coefficients of Eq. (14) become constants when the circuit constant $L_S$, the sampling time T and the output frequency $\omega$ are determined. Accordingly, they are constants in cases of fixed frequencies as in an UPS, an active filter, etc. In cases of variable frequencies, however, the coefficients change in trigonometrically with the change of $\omega$, and hence, they become complicated in constructing the digital control system. Therefore, the coefficients are simplified as in Eq. (16) under the condition that $\omega T$ is sufficiently small:

$$a = \cos\omega T \simeq 1, \; b = \sin\omega T \simeq \omega T \quad (16)$$

$$c = (\sin\omega T)/(\omega L_S) \simeq T/L_S$$

$$d = (2/\omega L_S)\sin^2\left(\dfrac{\omega T}{2}\right) \simeq \omega T^2/(2L_S)$$

As can be understood from the table of trigonometric functions, these approximations result in very large errors if $\omega T$ does not exceed 10 or 20 degrees.

Next, there will be described a method of a sampled decoupling three-phase current control system. In this method, first, a discrete time decoupling current control system on the d - q coordinates is derived and then this control system is inversely transformed into the U-V-W coordinates.

Figure 8:
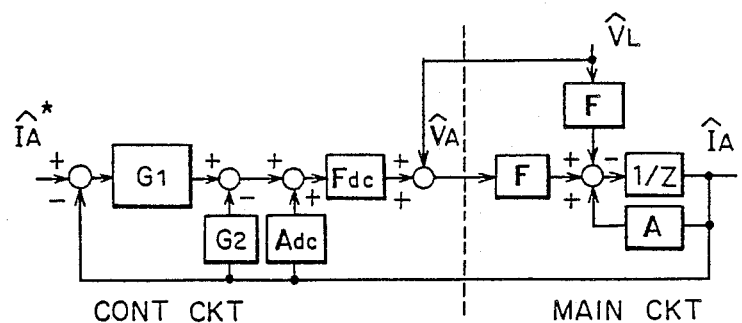
FIG. 8 is a block diagram of a discrete-time decoupling current control system on a d - q coordinates system.

In a block diagram FIG. 8, Eq. (15) is expressed as shown at the right of the dotted line. Since the main circuit in FIG. 8 undergoes the counter electromotive forces of the load as disturbances, the control system is first endowed with the counter electromotive force compensation in order to cancel the disturbances.

Both the matrices A and F have the coupling terms. Therefore, a decoupling matrix $F_{dc}$ satisfying the following equation is secondly provided in order to cancel the coupling terms of F.

$$F \, F_{dc} = C \quad (17)$$

By multiplying $F^{-1}$ by the left-hand side of Eq. (17), the following is obtained:

$$F_{dc} = F^{-1}c = \frac{c}{c^2 + d^2} \begin{pmatrix} c & d \\ -d & c \end{pmatrix} \quad (18)$$

Under ordinary circuit conditions, the following approximation holds, and hence, Eq. (20) is obtained:

$$(d/c)^2 = (\tan \omega T/2)^2 \simeq (\omega T/2)^2 \ll 1 \quad (19)$$

$$F_{dc} \simeq \begin{pmatrix} 1 & d/c \\ -d/c & 1 \end{pmatrix} \quad (20)$$

Further, a decoupling matrix $A_{dc}$ is provided in order to cancel the coupling terms of the matrix A. For this end, $F \, F_{dc} \, A_{dc}$ should have the opposite polarity from the coupling terms of the matrix A. Therefore, $A_{dc}$ is determined to meet the relation of Eq. (21):

$$F \, F_{dc} \, A_{dc} = \begin{pmatrix} 0 & b \\ -b & 0 \end{pmatrix}. \quad (21)$$

By applying Eq. (17) to this equation, $$A_{dc1} = \begin{pmatrix} 0 & b/c \\ -b/c & 0 \end{pmatrix} \quad (22)$$

By the way, b/c and d/c of the respective decoupling matrices $A_{dc}$ and $F_{dc}$ are as follows:

$$b/c = \omega \, LS, \quad (23)$$

$$d/c = \tan(\omega T/2) \simeq \omega T/2$$

The disturbances of the load voltage and the coupling terms have been compensated in the above way. Then, the controller with the proportional gain G1 and the state feedback of gain G2 is provided for respective d- and q-axis, as shown in FIG. 8.

The control system obtained in conjunction with FIG. 8 is formulated as the following equation (24):

$$\hat{V}_A{}^* = \hat{V}_L + F_{dc} [(A_{dc} - G_2) \hat{I}_A + G_1 ( \hat{I}_A{}^* - \hat{I}_A)] \quad (24)$$

By inversely transforming Eq. (24) into the U-V-W coordinates, the discrete time decoupling control can be established in the three-phase system. Using Eq. (8) the inverse transformation is performed as follows:

$$C \, V_A{}^* = C \, V_L + F_{dc} [(A_{dc} - G_2) \, C \, I_A + \quad (25)$$
$$G_1 ( \, C \, I_A{}^* - C \, I_A)]$$

Both sides of the Eq. (25) are multiplied by $C^{-1}$ from the left, and the result is arranged. Then, the following is obtained:

$$V_A{}^* = V_L + [\, \phi^{-1} F_{dc}/A_{dc} \, \phi - G_2 \, \phi^{-1}/F_{dc} \, C]I_A + \quad (26)$$
$$G_1 \, \phi^{-1}/F_{dc} \, \phi(I_A{}^* - I_A)]$$

Here, the relations of the following equations (27), (28) and (29) hold:

$$\phi^{-1} \, F_{dc} \, A_{dc} \, C = C^{-1}\left\{ \frac{-bd}{c^2+d^2} + \frac{bc}{c^2+d^2}\begin{pmatrix} 0 & 1 \\ -1 & 0 \end{pmatrix}\right\} \phi \quad (27)$$

$$= \frac{-bd}{c^2+d^2} + \frac{bc}{c^2+d^2} \frac{1}{\sqrt{3}} \begin{pmatrix} 0 & -1 & 1 \\ 1 & 0 & -1 \\ -1 & 1 & 0 \end{pmatrix}$$

$$\simeq \frac{b}{c}\left(-\frac{d}{c} + H\right) \simeq \frac{b}{c} \, H$$

Here, the following approximations are employed assuming ordinary circuit conditions:

$$bd/c^2 \simeq (\omega Ls)(\omega T/2) \simeq 0 \quad (28)$$

$$\phi^{-1} \, F_{dc} \, C = \phi^{-1}\left\{ \frac{c^2}{c^2+d^2} + \frac{cd}{c^2+d^2}\begin{pmatrix} 0 & 1 \\ -1 & 0 \end{pmatrix}\right\} \phi$$

$$= \frac{c^2}{c^2+d^2} + \frac{cd}{c^2+d^2} \frac{1}{\sqrt{3}} \begin{pmatrix} 0 & -1 & 1 \\ 1 & 0 & -1 \\ -1 & 1 & 0 \end{pmatrix}$$

$$\simeq \left(1 + \frac{d}{c} \, H\right)$$

where $$IH = \frac{1}{\sqrt{3}} \begin{pmatrix} 0 & -1 & 1 \\ 1 & 0 & -1 \\ -1 & 1 & 0 \end{pmatrix}$$ (29)

The relations of Eqs. (27), (28) and (29) are applied to Eq. (26), and the result is arranged. Then, Eq. (30) is obtained as a control algorithm in U-V-W coordinates:

$$\begin{aligned} V_A{}^* &= V_L + [\omega L_s\, IH - G_2(1 + \omega T\, IH/2)]\, I_A + \\ &\quad G_1(1 + \omega T\, IH/2)(I_A{}^* - I_A) \\ &= V_L + \omega L_s\, IH\, I_A + \\ &\quad [G_1(I_A{}^* - I_A) - G_2 I_A](1 + \omega T\, IH/2) \end{aligned}$$ (30)

Here, signals $S_1$, $S_2$ and $S_3$ are as follows:

$$\begin{aligned} S_1 &= col\, [S_{1U},\, S_{1V},\, S_{1W}] \\ &= (1 + k_A \pi f T\, IH)\, G_1\, (I_A{}^* - I_A) \\ S_2 &= col\, [S_{2U},\, S_{2V},\, S_{2W}] \\ &= 2 k_B \pi f L_s\, H\, I_A \\ S_3 &= col\, [S_{3U},\, S_{3V},\, S_{3W}] = S_1 + S_2 \end{aligned}$$

where $G_1$ and $G_2$ are control transfer functions, $k_A$ and $k_B$ are, in effect, constants of 1.0 corresponding to corrections from theoretical values, and "col" indicates column matrix. By applying these relations to Eq. (30), Eq. (31) is obtained:

$$\begin{aligned} V_A{}^* &= V_L + S_1 + S_2 - G_2 I_A (1 + \omega T\, H/2) \\ &= V_L + S_3 - G_2 I_A (1 + \omega T\, H/2) \end{aligned}$$ (31)

In Eqs. (30) and (31), output currents, the command thereof, output voltage command, and load voltages are respectively given by the following column matrices $$\begin{aligned} I_A &= col\, [I_{AU},\, I_{AV},\, I_{AW}] \\ I_A{}^* &= col\, [I_{AU}{}^*,\, I_{AV}{}^*,\, I_{AW}{}^*] \\ V_A{}^* &= col\, [V_{AU}{}^*,\, V_{AV}{}^*,\, V_{AW}{}^*] \\ V_L &= col\, [V_{LU},\, V_{LV},\, V_{LW}] \end{aligned}$$

Accordingly, Eq. (31) affords all the three-phase voltage commands which the inverter should generate The usefulness of the compensation term $V_L$ for the load voltage variation in Eq. (31) has heretofore been well known. The term multiplied by the state feedback $G_2$ is not always necessary in the control system.

Consequently, the important control signals according to the present invention are the two terms of $S_1$ and $S_2$. Although the constant $k_A$ of the signal $S_1$ and the constant $k_B$ of the signal $S_2$ are intrinsically 1.0, values within a range of about 0.8 to about 1.2, roughly equal to 1, can satisfactorily bring forth the effects of the present invention.

The first equation of Eq. (30) is depicted as a block diagram in FIG. 1(a), and a current control system shown in FIG. 1(b), is obtained from the second equation. These control systems are equivalent to the control system on the d - q coordinates as shown in FIG. 8, and can attain equal decoupling performance.

Figure 1A:
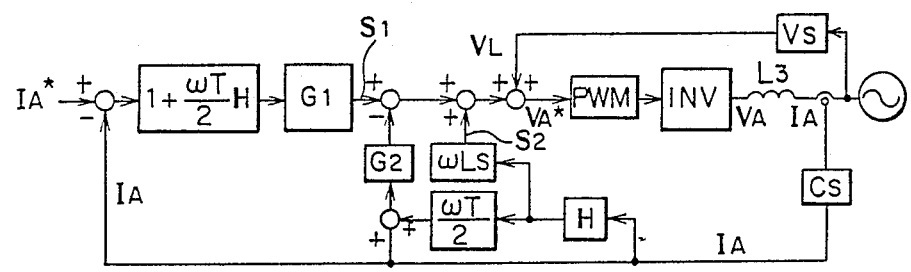
FIG. 1(a) is a block diagram showing an embodiment of a three-phase converter according to the present invention.
Figure 1B:
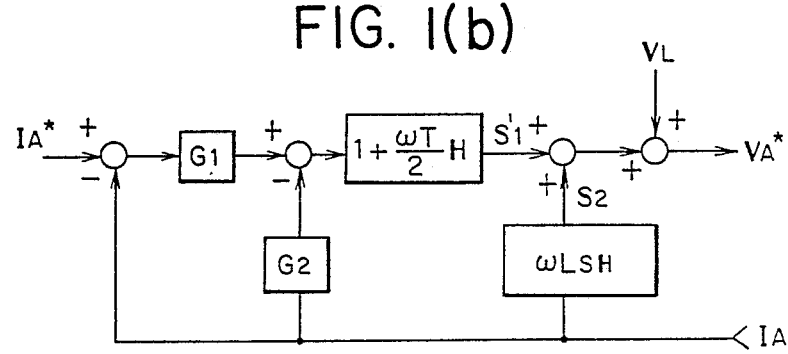
FIG. 1(b) is a block diagram of a control system according to another embodiment of the invention.
Figure 3:
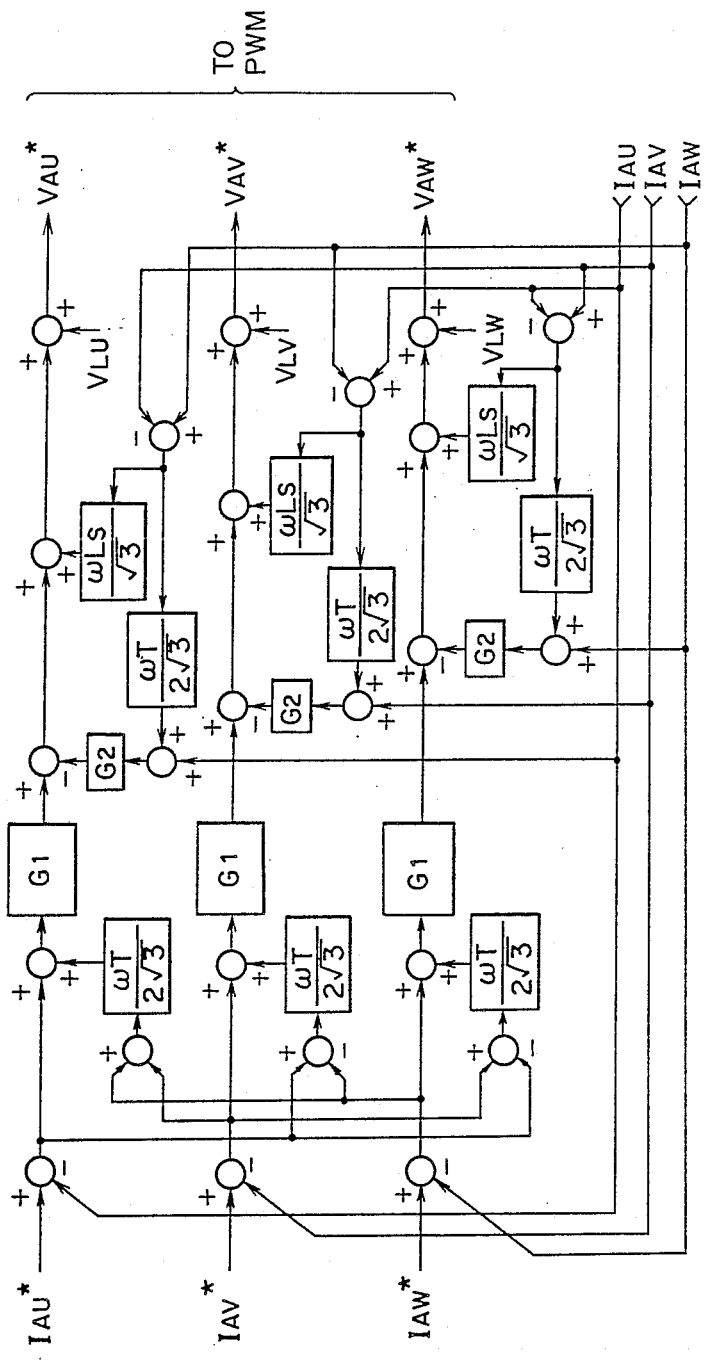
FIG. 3 is a block diagram of individual phases showing an embodiment of a current control system according to the present invention.
Figure 4:
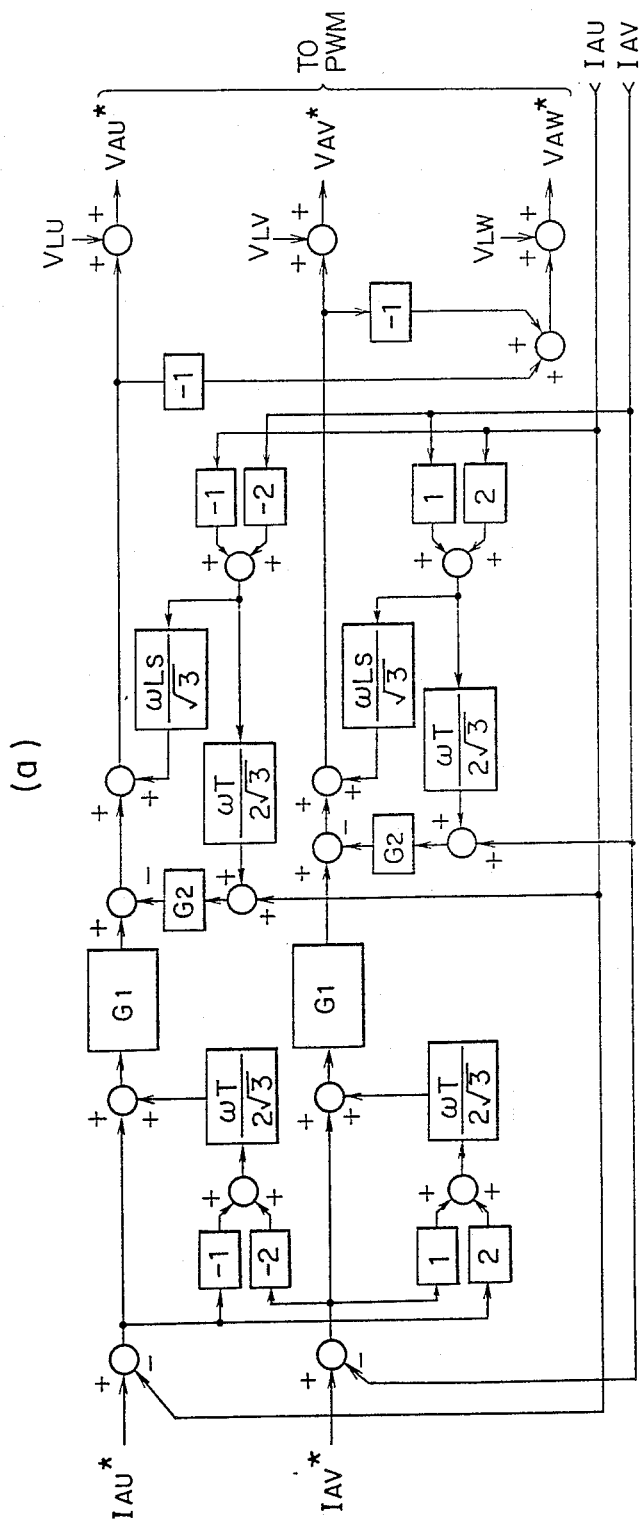
FIGS. 4(a) and 4(b) are block diagrams of individual phases each showing the current control system of the present invention in the case of a three-phase system.
Figure 4:
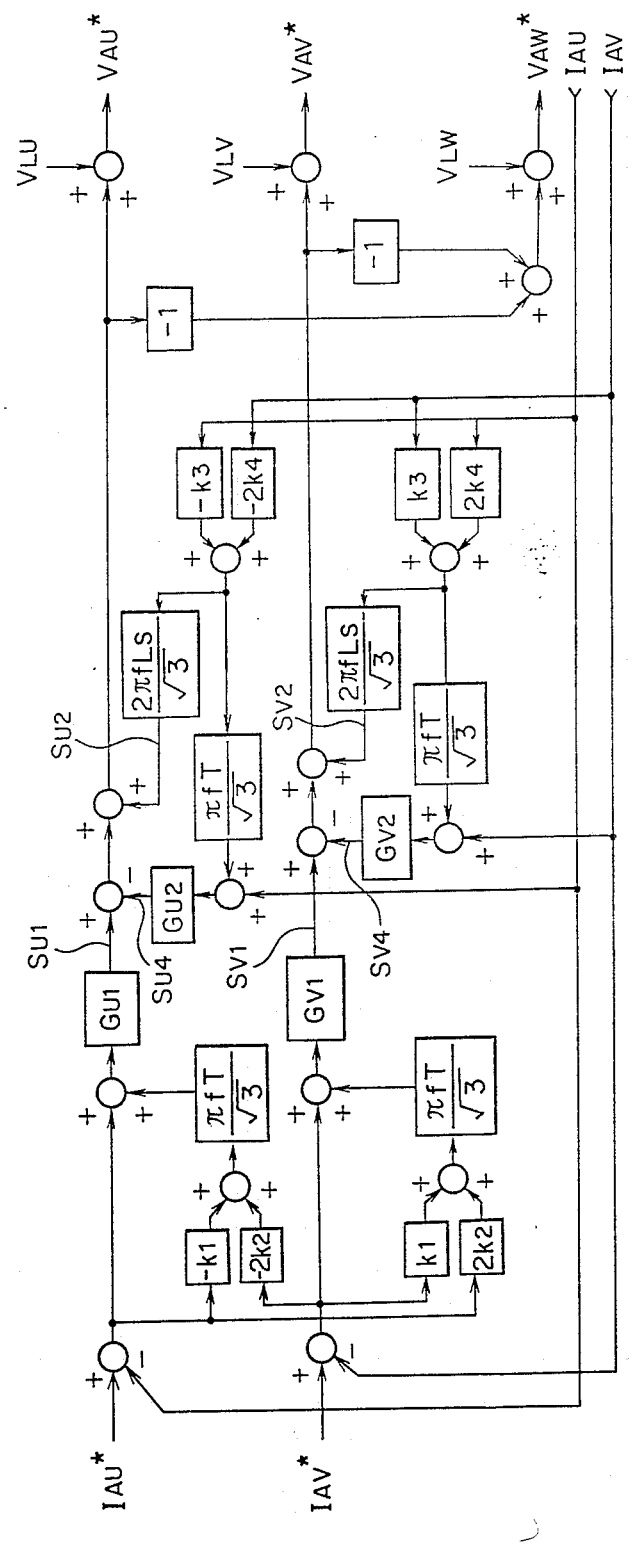
Figure 5:
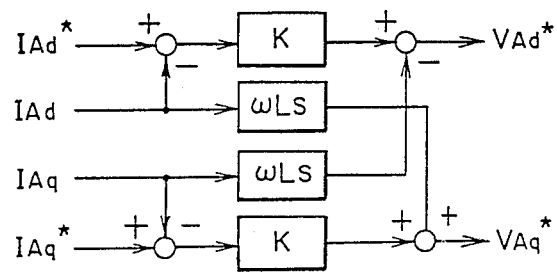
FIG. 5 is a block diagram of a current control system in the prior art.

When the block diagram of FIG. 1(a) is redrafted into practical blocks, a three-phase current control system in FIG. 3 can be obtained Further, in case of the ordinary three-phase three-wire system, the system can be simplified using the following relation, and hence, a control block diagram in FIG. 4(a) is obtained.

$$I_{AU} + I_{AV} + I_{AW} = 0$$ (32)

In FIGS. 1(a) and 1(b), FIG. 3 and FIG. 4(a), the decoupling based on Eqs. (29) and (30) is implemented. Needless to say, however, even when the decoupling matrix of Eq. (29) is not strictly used, that is, all or some of the elements 1 and $-1$ of the matrix of Eq. (29) are multiplied by $0.8 \sim 1.2$ and the resulting values are used for decoupling, sufficient effects are attained compared to a case where the decoupling operation is not adopted Although $G_1$ is a constant in this control system, it can be replaced with any desired transfer function, for example, proportional-plus-integral term.

It is a matter of course that a control system without the state feedback $G_2$ can be constructed.

Needless to say, the effects of the present invention can be partially utilized even when parts in FIGS. 1(a) and 1(b), for example, the decoupling control $(\omega T/2)$ $IH$ concerning the current deviation $I_A{}^* - I_A$ and the decoupling control $(\omega T/2)$ concerning the state feedback $G_2$, are omitted.

By way of example, the system in FIG. 4(a) is subjected to the various alterations as mentioned above, and the results are arranged in a block diagram. Then, FIG. 4(b) is obtained. In this figure, control signals:

$$S_{U1} = G_{U1}\, [(I_U{}^* - I_U) - (\pi f T/\sqrt{3})\, \{k_1\, (I_U{}^* - I_U) + 2 k_2\, (I_V{}^* - I_V)\}]$$ (33)

$$S_{V1} = G_{V1}\, [(I_V{}^* - I_V) + (\pi f T/\sqrt{3})\, \{2 k_2\, (I_U{}^* - I_U) + k_1\, (I_V{}^* - I_V)\}]$$ (34)

correspond to control operations for the current deviations, and control transfer functions $G_{U1}$ and $G_{V1}$ may be somewhat changed between the phases. Although $k_1$ and $k_2$ are intrinsically 1, they may be nearly 1 as, for example, $k_1 = 0.9$ and $k_2 = 1.1$. Further, there can be modifications in which $k_1 = k_2 = 0$ is held so as not to decouple the control of the current deviations and in which only decoupling operations to be stated below are performed.

The following control signals $$S_{u2} = -(2 \pi f L_s/\sqrt{3})(k_3 I_u + 2 k_4 I_v)$$ (35)

$$S_{v2} = +(2 \pi f L_s/\sqrt{3})(2 k_4 I_u + k_3 I_v)$$ (36)

decouple interactions ascribable to the reactances $L_S$ connected in series with the outputs of the converter $k_3$ and $k_4$ are, in effect, constants close to 1, and they are, for example, $k_3=0.9$ and $k_4=1.1$.

The following signals:

$$S_{u4} = G_{u2} \{Iu - (\pi fT/\sqrt{3})(k_3 Iu + 2k_4 Iv)\} \quad (37)$$

$$S_{v4} = G_{v2} \{Iv + (\pi fT/\sqrt{3})(2k_4 Iu + k_3 Iv)\} \quad (38)$$

decouple the decoupling concerning state feedback. Here, it is needless to say that there can be a control system without the state feedback itself, namely, a case of $G_{U2}=G_{V2}=0$. Besides, the decoupling coefficients $k_3$ and $k_4$ of the signals can be changed within a range of nearly 1 as in the foregoing. Further, there can be a modification in which $k_3=k_4=0$, whereby the state feedback is not subjected to decoupling.

Incidentally, in a case where the sampling time T is set at zero in this control system, only a decoupling term of $\omega L_S$ remains, and it is applicable for analog control or digital control of with a short sampling time T.

Figure 6:
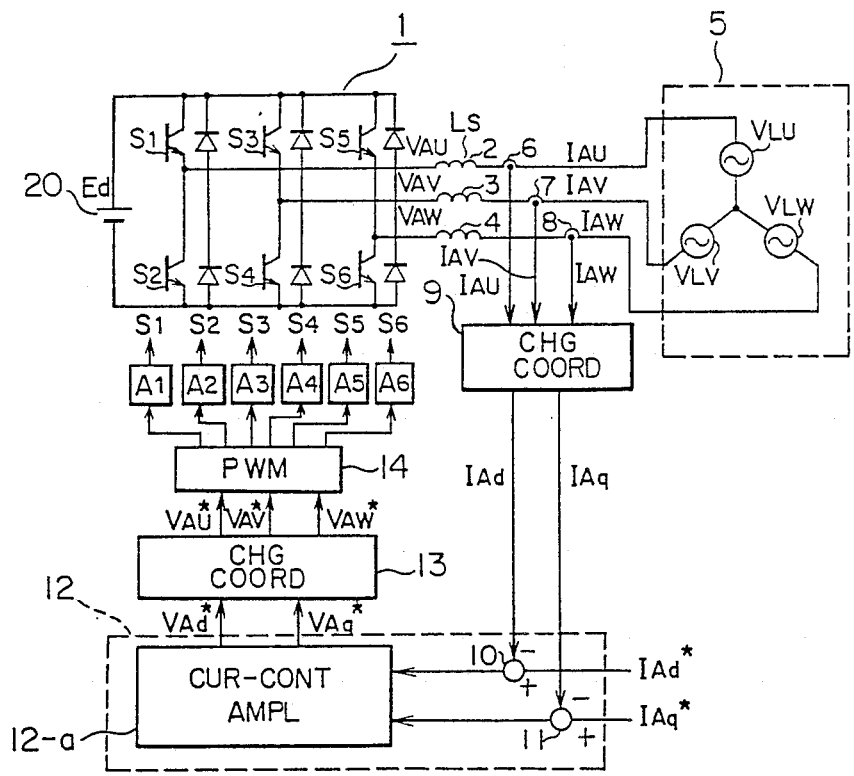
FIG. 6 is a circuit diagram for explaining a three-phase converter incorporating a prior-art current control system.
Figure 9:
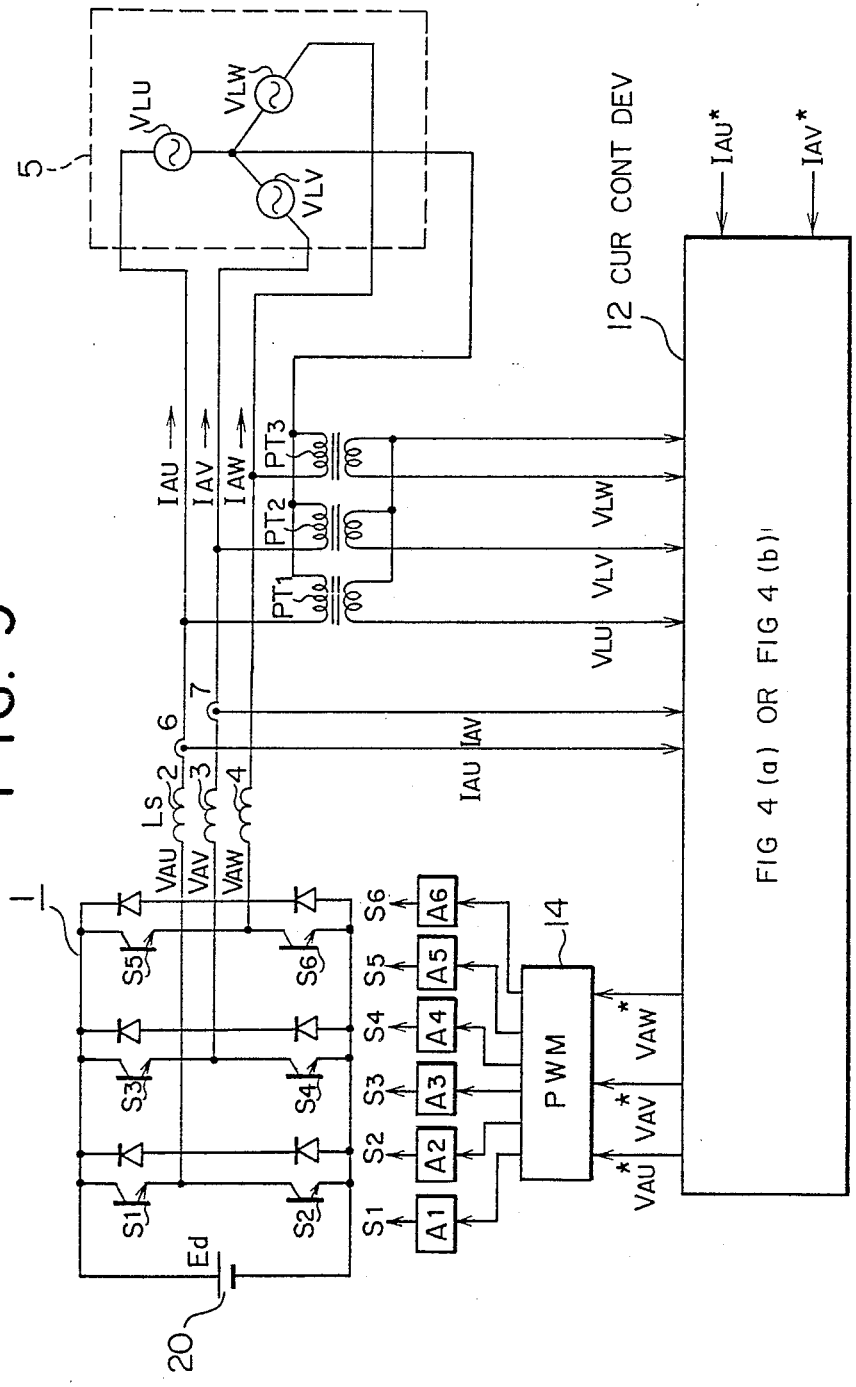
FIG. 9 is a general arrangement diagram of an embodiment of the three-phase converter of the present invention.

FIG. 9 shows an example of the general arrangement of the three-phase converter according to the present invention, in correspondence with FIG. 6 illustrative of the prior-art arrangement. The arrangement of FIG. 9 is basically different from that of FIG. 6 in that the coordinate transformation circuits 9 and 13 are not required. Meanwhile, the counter electromotive forces of the respective phases of a load are detected by voltage detecting transformers $PT_1$, $PT_2$ and $PT_3$, and the detected voltages are utilized as signals for compensating the counter electromotive forces. This method has hitherto been known though it is not illustrated in FIG. 6.

Figure 10:
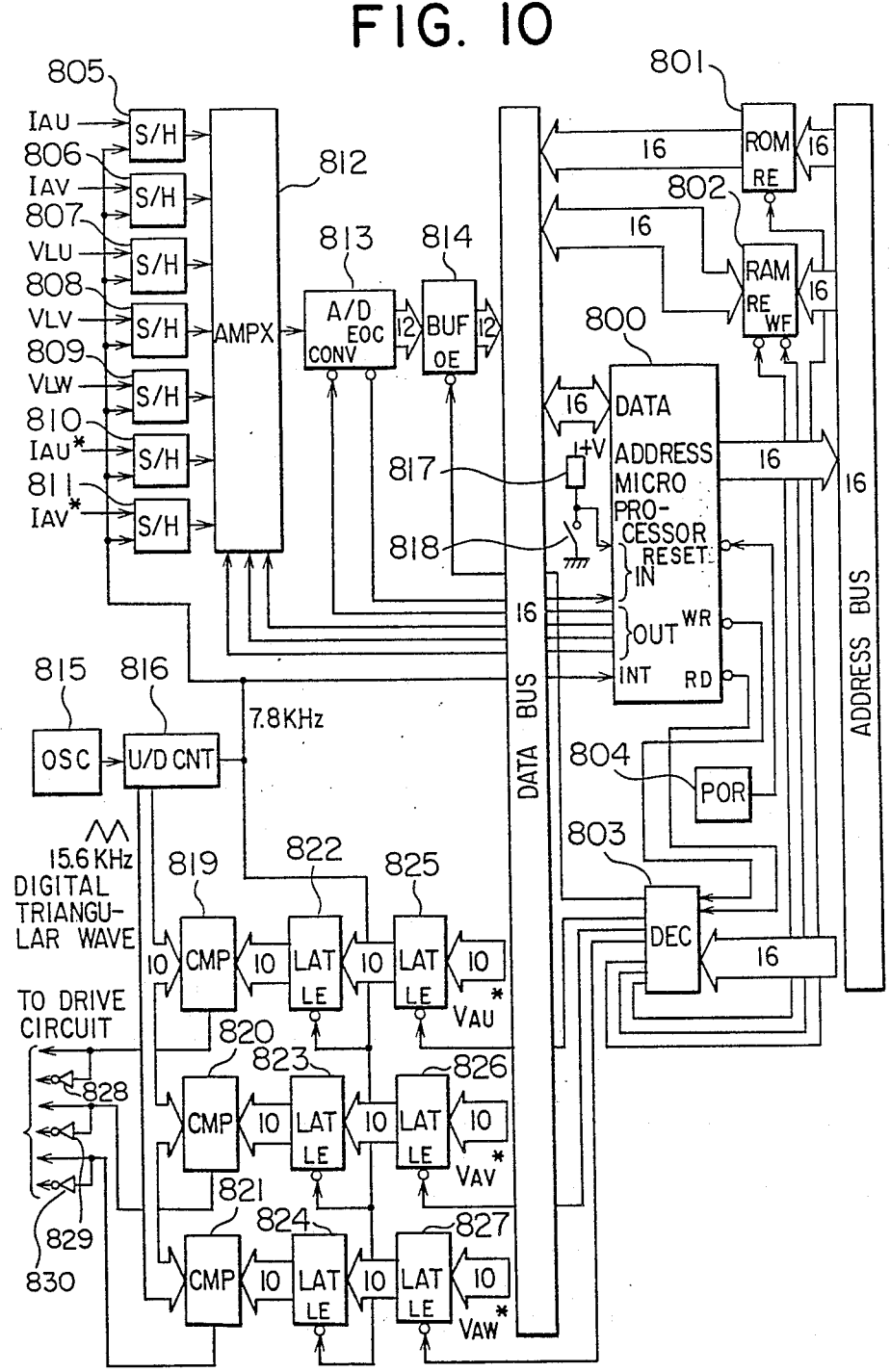
FIG. 10 is a block diagram of a practical control circuit according to the present invention.

FIG. 10 is a diagram showing the arrangement of a practicable control circuit. In this figure, the following symbols are used:

| MICROPROCESSOR (800) | |
|---|---|
| INT | Interrupt Input |
| IN | Input Port |
| OUT | Output Port |
| WR | Write Strobe |
| RD | Read Strobe |
| ROM | Read Only Memory (801) |
| RE | Read Enable |
| RAM | Random Access Memory (802) |
| RE | Read Enable |
| WE | Write Enable |
| DEC | Decoder (803) |
| POR | Power On Reset Circuit (804) |
| S/H | Sample-and-Hold Circuits (805–811) |
| AMPX | Analog Multiplexer (812) |
| A/D | Analog-to-Digital Converter (813) |
| CONV | Convert |
| EOC | End of Conversion |
| BUF | Buffer (814) |
| OE | Output Enable |
| OSC | Crystal Oscillator (815) |
| U/D CNT | Up/Down Counter (816) |
| CMP | Comparators (819–821) |
| LAT | Latches (822–827) |
| LE | Latch Enable |

The control circuit is constructed of a microprocessor 800, a ROM 801, a RAM 802, a decoder 803, a power-on-reset circuit 804, sample-and-hold circuits 805–811, an analog multiplexer 812, an analog-to-digital converter 813, a 3-state buffer 814, a crystal oscillator 815, an up/down counter 816, comparators 819–821, latches 822–827, inverters 828–830, a pull-up resistor 817, and a switch 818.

When a control power source is closed, the power-on-reset circuit 804 resets the microprocessor 800.

After being reset, the microprocessor 800 is operated by a program which is written in the ROM 801.

A control algorithm is executed in such a way that the microprocessor 800 accepts current and voltage data and current commands from the buffer 814, processes them according to the program of the ROM 801 and, using the RAM 802, and delivers the resulting PWM output voltage commands $V_{AU}^*$, $V_{AV}^*$ and $V_{AW}^*$ to the latches 825–827.

The ROM 801, the RAM 802, the buffer 814 having the current and voltage data and current command values, and the PWM output voltage command value latches 825–827 are all connected to a data bus, which is controlled by the decoder 803.

Figure 11:
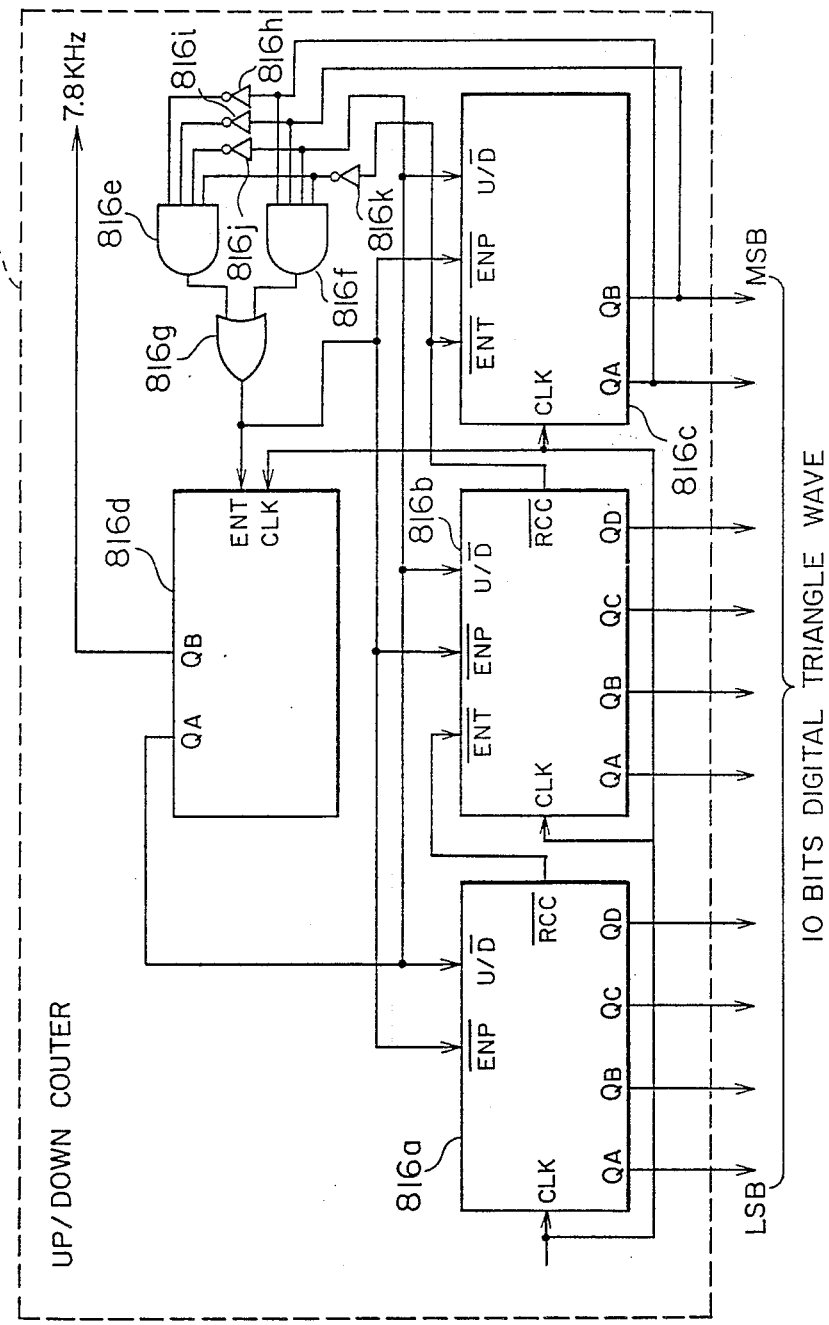
FIG. 11 is a block diagram of a counter which generates triangular waves.

An interrupt signal for the microprocessor 800, which determines a sampling time, is in synchronism with a PWM carrier frequency. An output frequency of 31.9488 MHz from the crystal oscillator 815 is applied to the up/down counter 816, thereby to produce a digital 10-bit triangular wave signal of 15.6 kHz and a clock signal of 7.8 kHz. An example of the up/down counter 816 is arranged as shown in FIG. 11. The clock signal of 7.8 kHz is applied to the interrupt input of the microprocessor 800, so that the control program is executed at the falling edge of each of the 7.8-kHz pulses.

The current values, voltage values and current commands have their analog quantities held in the sample-and-hold circuits 805–811 at the timing of the falling edge of the 7.8-kHz clock pulse, namely, at the interrupt timing of the microprocessor 800. The analog multiplexer 812 selects one of the seven sample-and-hold circuits, and issues a convert command to the A/D converter 813. When A/D conversion ends, the A/D converter 813 delivers an end-of-conversion signal. Upon receiving this signal, the microprocessor 800 loads an A/D conversion value through the buffer 814. This buffer 814 is connected to the lower 12 bits of the data bus. The channel select signal of the analog multiplexer 812 and the convert signal of the A/D converter 813 are delivered from the output port of the microprocessor 800.

The PWM output voltage commands are calculated within the sampling time, and are delivered to the latches 825–827. These latches 825–827 are connected to the lower 10 bits of the data bus. The data items of the latches 825–827 connected to the data bus are loaded in the latches 822–824 connected to the comparators 819–821, at the timing of the falling edge of the 7.8-kHz clock pulse. The data items of the latches 822–824 are compared with the digital triangular wave of 15.6 kHz by the comparators 819–821, and the resulting PWM outputs are applied through the inverters 828–830 to a drive circuit which controls the transistors or like switching elements of a main circuit.

The pull-up resistor 817 and the switch 818 are connected to the input port of the microprocessor 800. The microprocessor 800 loads the ON/OFF state of the switch 818, and in case of the ON state, it starts the control, whereas in case of the OFF state, it initializes the memories etc. and makes ready for the next start.

In the above, a typical hardware construction has been described without mentioning any specified microprocessor. In a concrete example with a low switching frequency, Type 186 Microprocessor manufactured by Intel Inc. is employed, and in case of a high switching frequency, Digital Signal Processor TMS320C25 manufactured by Texas Instruments Inc. is employed, whereby an arrangement which is fundamentally the same as that of FIG. 10 can be realized.

Figure 12:
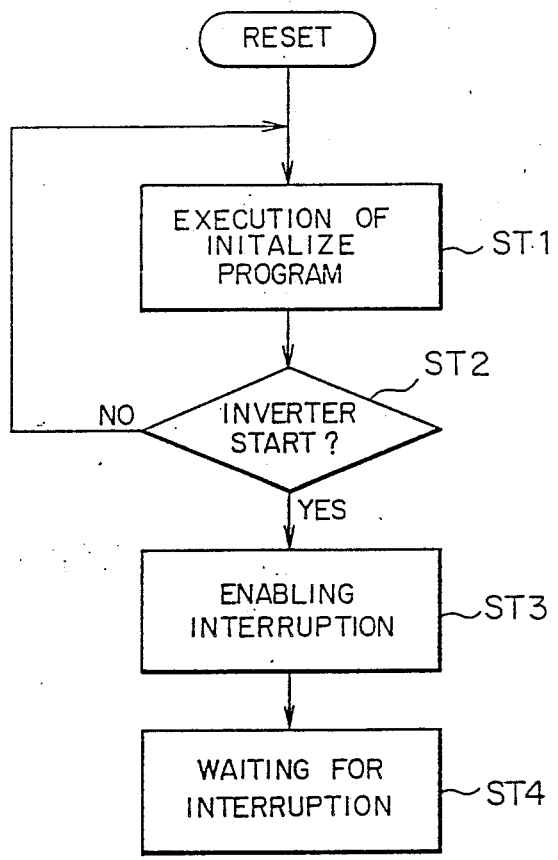
FIG. 12 is a flow chart of a control program.

The flow chart of the control program is shown in FIG. 12. In this case, high-speed switching transistors are supposed, and the sampling period of 7.8 kHz is adopted, so that the use of the Digital Signal Processor mentioned above is implied.

Referring to FIG. 12, when the control power source is closed, the microprocessor is reset. It executes an initialize program to initialize the memories and to set the ports (ST1). Subsequently, if the state of the switch is "inverter start" (ST2), the control flow proceeds to a step ST3 at which an interrupt is enabled. Subsequently, the interrupt is waited for (ST4).

The control algorithm is executed at every interrupt at 7.8 kHz. Accordingly, the processing time of the control algorithm should be shorter than (1/7.8 kHz)=128.2 μsec.

Figure 13A:
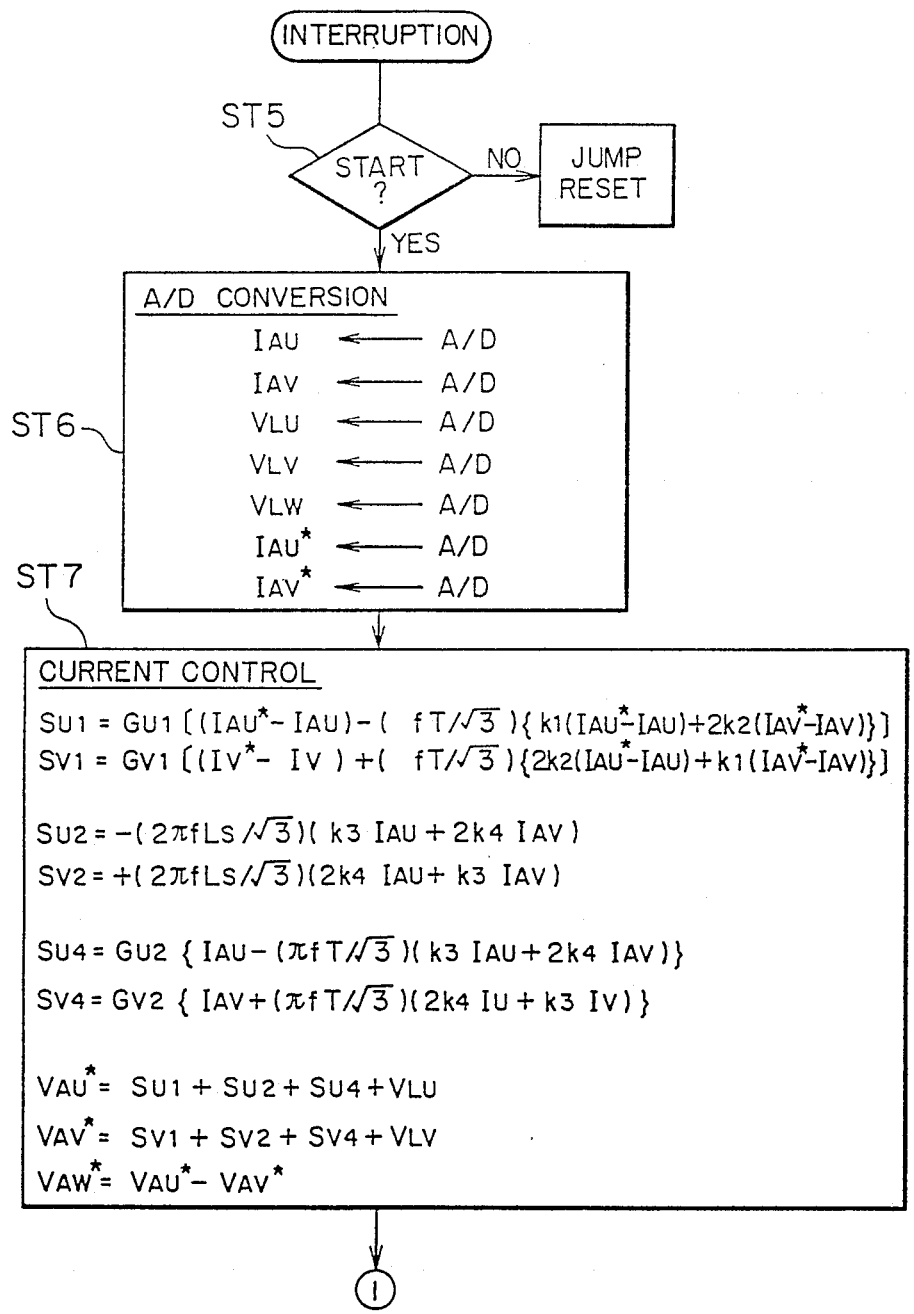
FIGS. 13A and 13B are flow charts of an interrupt program.
Figure 13B:
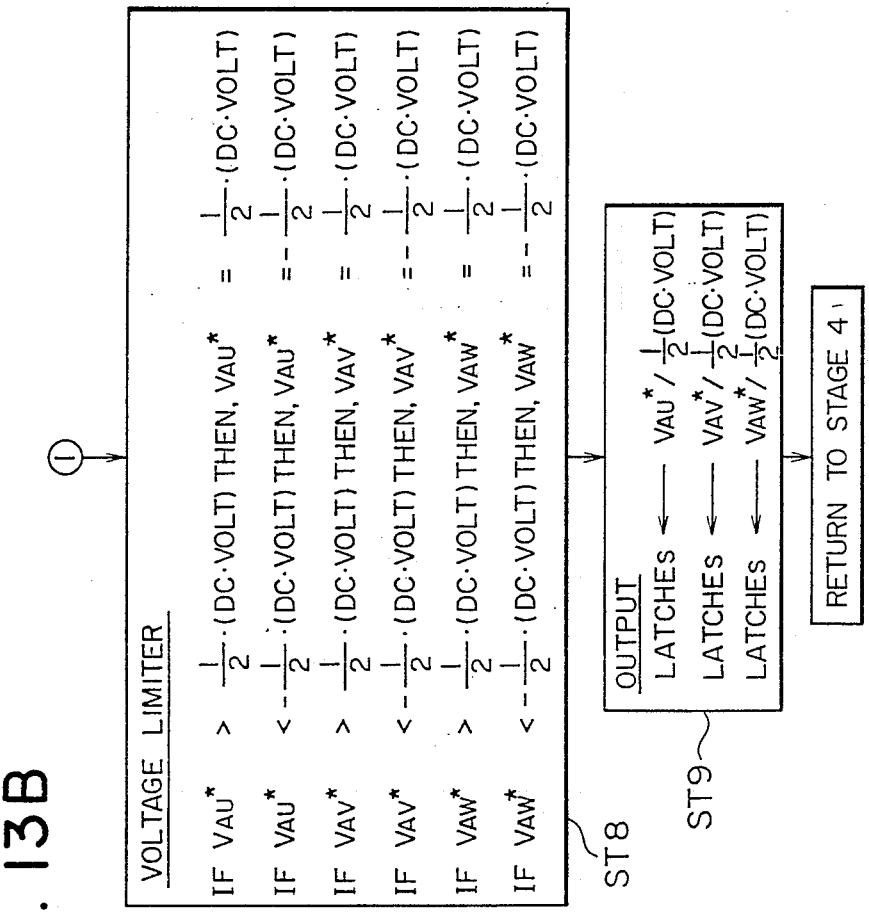

The flow chart of an interrupt program will be described with reference to FIGS. 13A and 13B.

If the state of the switch is "inverter stop" (ST5), the initialize program is executed. The microprocessor loads currents $I_A$, voltages $V_L$ and current command values $I_A^*$ from the A/D converter (ST6). Current control loops are computed to derive inverter output voltage command values $V_A^*$ (ST7). The inverter output voltage command values $V_A^*$ are limited by the D.C. circuit voltage of the inverter (ST8). The voltage command values $V_A^*$ are divided by the D.C. circuit voltage of the inverter, and the results are delivered to the PWM modulation circuit as duty command values (ST9).

Incidentally, the up/down counter 816 shown in FIG. 11 is configured of the following constituents:

| | |
|---|---|
| 816a | UP/DOWN 4-BIT BINARY COUNTER |
| 816b | do. |
| 816c | do. |
| 816d | 4-BIT BINARY COUNTER |
| 816e | 4-INPUT AND GATE |
| 816f | do. |
| 816g | 2-INPUT OR GATE |
| 816h | INVERTER |
| 816i | do. |
| 816j | do. |
| 816k | do. |

Although, in the above, the present invention has been described for application to the three-phase bridge inverter, it is also applicable to a so-called high-frequency intermediate link type converter in which an inverter and cycloconverters are combined as shown in FIG. 14(a).

This system is such that high-frequency single-phase power generated by the inverter 705 is converted into low-frequency power of any desired frequency by the cycloconverters 701, 702 and 703 constructed of self-extinguishing elements as shown in FIG. 14(b), and that sinusoidal waves of desired frequency are obtained by passing the low-frequency power through a filter which is constructed of reactors 706, 707 and 708 and capacitors 709, 710 and 711.

In this case, the control circuit in FIG. 9 is arranged as in the case of the inverter, and at a stage succeeding the output of each phase of the PWM circuit, for example, the output of the U-phase, a circuit which switches the output of the PWM circuit between the switches $S_1$ and $S_2$ in accordance with the polarity of the output voltage of the inverter may be merely added. Thus, fundamentally the same principle of the decoupling control is applicable.

As set forth above, according to the control system of the present invention, current and voltage signals need not be transformed into d - q coordinates, so that economization an economy and enhancement in performance based on a shortened calculation time can be realized.

Moreover, a strict decoupling current control system is constructed on the basis of the strictly sampled equation of the main circuit, so that favorable control performance can be realized when the sampling time T of a digital control is inevitably not short enough.

The method of the present invention can construct a simple decoupling control system without d - q transformations, where the host control system is not necessarily constructed on a d - q coordinates as in a sinusoidal wave inverter or high-power-factor converter, therefore it is very highly practicable.

The method is not restricted to inverters, but is extensively applicable to three-phase converters such as cycloconverters.

What is claimed is:

1. A method of operating a three-phase converter producing an output signal at an output frequency f from input power at a different, first frequency, including direct current, wherein the input power is switched a plurality of times within one cycle of the output frequency comprising:
   (a) supplying input current and voltage of a first frequency from a signal generating means including switching elements;
   (b) transforming said voltage and current signals into the d-q coordinate system;
   (c) time sampling said current and voltage signals;
   (d) decoupling said current and voltage signals;
   (e) inverse transforming said current and voltage signals into the u-v-w coordinate system thereby generating a three phase output signal of frequency f; and
   (f) pulse width modulating said phase output signals and feeding the modulated phase output signals back into the signal generating means to activate the switching elements of said signal generating means.

2. The method of operating a three-phase converter according to claim 1, wherein the d-q coordinate transformation is performed by applying a matrix C to said voltage and current signals, where C is $$C = \sqrt{\frac{2}{3}} \begin{pmatrix} \cos\omega t & \cos(\omega t - 2\pi/3) & \cos(\omega t + 2\pi/3) \\ \sin\omega t & \sin(\omega t - 2\pi/3) & \sin(\omega t + 2\pi/3) \end{pmatrix}.$$

3. The method of operating a three-phase converter according to claim 2 wherein time sampling is effected by taking the Z transform of said voltage and current signals.

4. The method of operating a three-phase converter according to claim 3 wherein decoupling and inverse transforming of said current and voltage signals is effected by applying a control signal $S_3 = \text{col}(S_{3u}, S_{3v}, S_{3w}) = \$_1 + \$_2$ to said current and voltage signals where $S_1 = \text{col}(S_{1u}, S_{1v}, S_{1w}) = (1 + k_A \pi fTH)G_1(I_A{}^* - I_A),$
$S_2 = \text{col}(S_{2u}, S_{2v}, S_{2w}) = 2k_B \pi f L_S H I_A$
$\pi = 3.1416\ldots,$ and $$H = \frac{1}{\sqrt{3}} \begin{pmatrix} 0 & -1 & 1 \\ 1 & 0 & -1 \\ -1 & 1 & 0 \end{pmatrix}.$$

5. The method of operating a three-phase converter according to claim 3 wherein decoupling and inverse transforming of said current and voltage signals is effected by applying a control signal $S_1$ to said current and voltage signals where $S_1 = \text{col}(S_{1u}, S_{1v}, S_{1w}) = (1 + k_A \pi fTH)G_1(I_A{}^* - I_A),$
$\pi = 3.1416\ldots,$ and $$H = \frac{1}{\sqrt{3}} \begin{pmatrix} 0 & -1 & 1 \\ 1 & 0 & -1 \\ -1 & 1 & 0 \end{pmatrix}.$$

6. A method of operating a three-phase converter producing an output signal at an output frequency f from input power at a different, first frequency, including direct current, wherein the input power is switched a plurality of times within one cycle of output frequency comprising:
   (a) supplying input current and voltage signals of a first frequency from a signal generating means including switching elements;
   (b) transforming said voltage and current signals into the d-q coordinate system by multiplying said current and voltage signals by a matrix C, where $$C = \sqrt{\frac{2}{3}} \begin{pmatrix} \cos\omega t & \cos(\omega t - 2\pi/3) & \cos(\omega t + 2\pi/3) \\ \sin\omega t & \sin(\omega t - 2\pi/3) & \sin(\omega t + 2\pi/3) \end{pmatrix}$$

(c) time sampling said current and voltage signals by taking the Z-transform of said signals;
   (d) decoupling and inverse transforming said current and voltage signals by applying a control signal $S_1 = \text{col}(S_{1u}, S_{1v}, S_{1w})$ to said current and voltage signals, where $S_{u1} = G_{u1}[(I_u{}^* - I_u) - (\pi fT/\sqrt{3})\{k_1(I_u{}^* - I_u) + 2k_2(I_v{}^* - I_v)\}]$ $S_{v1} = G_{v1}[(I_v{}^* - I_v) + (\pi fT/\sqrt{3})\{2k_2(I_u{}^* - I_u) + k_1(I_v{}^* - I_v)\}]$
$\pi = 3.1416\ldots$ thereby generating respective phase output voltages in correspondence with the signals $S_{u1}$, $S_{v1}$; and
   (e) pulse width modulating said phase output signals and feeding the modulated phase output signals back into the signal generating means to activate the switching elements of said signal generating means.

7. A method of operating a three-phase converter producing an output signal at an output frequency f from input power at a different, first frequency, including direct current, wherein the input power is switched a plurality of times within one cycle of output frequency comprising:
   (a) supplying input current and voltage signals of a first frequency from a signal generating means including switching elements;
   (b) transforming said voltage and current signals into the d-q coordinate system by multiplying said current and voltage signals by a matrix C, where $$C = \sqrt{\frac{2}{3}} \begin{pmatrix} \cos\omega t & \cos(\omega t - 2\pi/3) & \cos(\omega t + 2\pi/3) \\ \sin\omega t & \sin(\omega t - 2\pi/3) & \sin(\omega t + 2\pi/3) \end{pmatrix}$$

(c) time sampling said current and voltage signals by taking the Z-transform of said signals;
   (d) decoupling and inverse transforming said current and voltage signals by applying a control signal and $S_2 = \text{col}(S_{2u}, S_{2v}, S_{2w})$ to said current and voltage signals, where $S_{u1} = G_{u1}[(I_u{}^* - I_u) - (\pi fT/3)\{k_1(I_u{}^* - I_u) + 2k_2(I_v{}^* - I_v)\}]$
$S_{v1} = G_{v1}[(I_v{}^* - I_v) + (\pi fT/3)\{2k_2(I_u{}^* - I_u) + k_1(I_v{}^* - I_v)\}]$
$S_{u2} = -(2\pi fL_s/3)(k_3 I_u + 2k_4 I_v)$
$S_{v2} = (2\pi fL_s/3)(2k_4 I_u + k_3 I_v)$
$\pi = 3.1416\ldots$ thereby generating respective phase output voltages in correspondence with the signals $S_{u1}$, $S_{v1}$, $S_{u2}$, $S_{v2}$; and
   (e) generating control signals $S_{u3} = S_{u1} + S_{u2}$ and $S_{v3} = S_{v1} + S_{v2}$; and
   (f) pulse width modulating said phase output signals and feeding the modulated phase output signals back into the signal generating means to activate the switching elements of said signal generating means.

8. A method of operating a three-phase converter producing an output signal at an output frequency f from input power at a different, first frequency, including direct current, wherein the input power is switched a plurality of times within one cycle of output frequency comprising:
   (a) supplying input current and voltage signals of a first frequency from a signal generating means including switching elements;
   (b) transforming said voltage and current signals into the d-q coordinate system by multiplying said current and voltage signals by a matrix C, where $$C = \sqrt{\frac{2}{3}} \begin{pmatrix} \cos\omega t & \cos(\omega t - 2\pi/3) & \cos(\omega t + 2\pi/3) \\ \sin\omega t & \sin(\omega t - 2\pi/3) & \sin(\omega t + 2\pi/3) \end{pmatrix}$$

(c) time sampling said current and voltage signals by taking the Z-transform of said signals;
   (d) decoupling and inverse transforming said current and voltage signals by applying a control signal $S_1 = \text{col}(S_{1u}, S_{1v}, S_{1w})$ to said current and voltage signals, where $S_{u1} = G_{u1}[(I_u{}^* - I_u) - (\pi fT/\sqrt{3})\{k_1(I_u{}^* - I_u) + 2k_2(I_v{}^* - I_v)\}]$ $S_{v1} = G_{v1}[(I_v{}^* - I_v) + (\pi fT/\sqrt{3})\{2k_2(I_u{}^* - I_u) + k_1(I_v{}^* - I_v)\}]$ $S_{u4} = G_{u2}[I_u - (\pi fT/\sqrt{3})(k_3 I_u + 2k_4 I_v)]$ $S_{v4} = G_{v2}[I_v + (\pi fT/\sqrt{3})(2k_4 I_u + k_3 I_v)]$ and
$\pi = 3.1416\ldots$ thereby generating respective phase output voltages in correspondence with the signals $S_{u1}$, $S_{v1}$;

(e) generating control signals $S_{u5}=S_{u1}-S_{u4}$ and $S_{v5}=S_{v1}-S_{v4}$; and (f) pulse width modulating said phase output signals and feeding the modulated phase output signals back into the signal generating means to activate the switching elements of said signal generating means.

* * * * *